(12) United States Patent
Chu et al.

(10) Patent No.: US 12,719,602 B2
(45) Date of Patent: Aug. 25, 2026

(54) FRAME FORWARDING FOR RANGE EXTENSION IN A WIRELESS NETWORK

(71) Applicant: NXP USA, Inc., Austin, TX (US)

(72) Inventors: Liwen Chu, San Ramon, CA (US); Rui Cao, Sunnyvale, CA (US); Kiseon Ryu, San Diego, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 386 days.

(21) Appl. No.: 18/240,308

(22) Filed: Aug. 30, 2023

(65) Prior Publication Data

US 2024/0072924 A1 Feb. 29, 2024

Related U.S. Application Data

(60) Provisional application No. 63/378,909, filed on Oct. 10, 2022, provisional application No. 63/373,889, filed on Aug. 30, 2022.

(51) Int. Cl.
*H04L 1/00* (2006.01)
*H04W 74/0816* (2024.01)

(52) U.S. Cl.
CPC ....... *H04L 1/0003* (2013.01); *H04W 74/0816* (2013.01)

(58) Field of Classification Search
CPC ............... H04L 1/0003; H04L 1/0025; H04W 74/0816; H04W 84/12; H04B 7/15557
See application file for complete search history.

(56) References Cited

U.S. PATENT DOCUMENTS

2015/0358067 A1* 12/2015 Zhang ................. H04W 84/047 370/315
2016/0316418 A1* 10/2016 Torab Jahromi ...... H04L 45/566
2016/0323879 A1* 11/2016 Ghosh ................. H04W 74/006
2017/0026162 A1* 1/2017 Nabetani ............... H04L 1/1854
2017/0048048 A1 2/2017 Seok
2017/0150493 A1 5/2017 Seok
2017/0171878 A1 6/2017 Chun et al.
2017/0325202 A1* 11/2017 Verma ................... H04W 74/04
2019/0364555 A1 11/2019 Huang et al.
2021/0168712 A1* 6/2021 Cherian ............ H04W 52/0216
2022/0279602 A1 9/2022 Xue et al.
2023/0336997 A1 10/2023 Ho et al.
2024/0129953 A1 4/2024 Ko et al.

(Continued)

FOREIGN PATENT DOCUMENTS

WO WO-2017211123 A1 * 12/2017 ............ H04W 76/11
WO WO-2023249474 A1 * 12/2023 ............ H04W 48/16

OTHER PUBLICATIONS

Non-Final Office Action U.S. Appl. No. 18/242,494, sent Feb. 6, 2025, 19 pages.

(Continued)

*Primary Examiner* — Charles C Jiang

(57) ABSTRACT

Embodiments of a method and apparatus for wireless communications are disclosed. In an embodiment, a wireless relay device includes a wireless transceiver configured to receive, from a first wireless device, communications data, and a controller configured to determine whether to forward the received communications data to a second wireless device.

25 Claims, 12 Drawing Sheets

(56) References Cited

U.S. PATENT DOCUMENTS

2024/0259793 A1 8/2024 Aio et al.

OTHER PUBLICATIONS

Final Office Action U.S. Appl. No. 18/242,494, sent Jun. 26, 2025, 13 pages.
Non-Final Office Action U.S. Appl. No. 18/242,494, sent Sep. 25, 2025, 14 pages.
U.S. Appl. No. 18/242,494; 38 pages (Sep. 5, 2023).
Notice of Allowance U.S. Appl. No. 18/242,494, sent Jan. 29, 2026, 12 pages.

* cited by examiner

FRAME FORWARDING FOR RANGE EXTENSION IN A WIRELESS NETWORK

CROSS-REFERENCE TO RELATED APPLICATIONS

This application is entitled to the benefit of U.S. Provisional Patent Application Ser. No. 63/373,889, filed on Aug. 30 2022, and U.S. Provisional Patent Application Ser. No. 63/378,909, filed on Oct. 10, 2022, each of which is incorporated by reference herein.

BACKGROUND

Wireless communications devices, e.g., access points (APs) or non-AP devices can transmit various types of information using different transmission techniques. For example, various applications, such as, Internet of Things (IoT) applications can conduct wireless local area network (WLAN) communications, for example, based on Institute of Electrical and Electronics Engineers (IEEE) 802.11 family of standards (e.g., Wi-Fi standards). Some applications, for example, high definition (HD) video surveillance applications, outdoor video sharing applications, etc., require relatively high system throughput as well as good network coverage. However, typical range extension (ER) techniques provide limited wireless transmission range extension.

SUMMARY

Embodiments of a method and apparatus for wireless communications are disclosed. In an embodiment, a wireless relay device includes a wireless transceiver configured to receive, from a first wireless device, communications data, and a controller configured to determine whether to forward the received communications data to a second wireless device. Other embodiments are also disclosed.

In an embodiment, the controller is further configured to determine whether to forward the received communications data to the second wireless device based on a header of the communications data.

In an embodiment, the header includes a physical layer (PHY) header of the communications data.

In an embodiment, the header includes a Media Access Control (MAC) header of the communications data.

In an embodiment, the controller is further configured to determine whether end-to-end acknowledgement is applied to the communications data.

In an embodiment, the controller is further configured to update a receiver address (RA) and a transmitter address (TA) of a frame of the received communications data when forwarding the received communications data to the second wireless device.

In an embodiment, the controller is further configured to keep a receiver address (RA) and a transmitter address (TA) of a frame of the received communications data when forwarding the received communications data to the second wireless device.

In an embodiment, the wireless relay device is compatible with an Institute of Electrical and Electronics Engineers (IEEE) 802.11 protocol.

In an embodiment, the wireless transceiver is further configured to share a transmit opportunity (TXOP) of the first wireless device.

In an embodiment, the wireless transceiver is further configured to share the TXOP of the first wireless device in a multi-hop transmission, and the multi-hop transmission is conducted through an aggregated PPDU.

In an embodiment, the aggregated PPDU includes a first PPDU and a second PPDU that is a relayed version of the first PPDU.

In an embodiment, the header of the communications data includes an indication whether the communications data is to be forwarded by the wireless relay device, and the header includes a PHY header or a MAC header of the communications data.

In an embodiment, the controller is further configured to determine whether to forward the received communications data to the second wireless device based on the indication in the header.

In an embodiment, the wireless transceiver is further configured to forward the received communications data to the second wireless device after a pre-defined interframe spacing (IFS).

In an embodiment, the wireless transceiver is further configured to transmit, to the first wireless device, a frame including information regarding modulation and coding scheme (MCS), number of spatial streams (NSS), and bandwidth (BW) restriction used for forwarding the received communications data to the second wireless device.

In an embodiment, a wireless relay device compatible with an Institute of Electrical and Electronics Engineers (IEEE) 802.11 protocol includes a wireless transceiver configured to receive, from a first wireless device, communications data, and a controller configured to determine whether to forward the received communications data to a second wireless device based on a header of the communications data and to determine whether end-to-end acknowledgement is applied to the communications data.

In an embodiment, the header includes a PHY header of a PPDU of the communications data.

In an embodiment, the header includes an MAC header of a frame of the communications data.

In an embodiment, the controller is further configured to update a receiver address (RA) and a transmitter address (TA) of a frame of the received communications data when forwarding the received communications data to the second wireless device.

In an embodiment, the controller is further configured to keep a receiver address (RA) and a transmitter address (TA) of a frame of the received communications data when forwarding the received communications data to the second wireless device.

In an embodiment, the wireless transceiver is further configured to share a TXOP of the first wireless device.

In an embodiment, the wireless transceiver is further configured to share the TXOP of the first wireless device in a multi-hop transmission, and the multi-hop transmission is conducted through an aggregated PPDU.

In an embodiment, a method for wireless communications involves receiving, from a first wireless device, communications data, and determining whether to forward the received communications data to a second wireless device.

In an embodiment, the method further includes transmitting, to the first wireless device, a frame including information regarding modulation and coding scheme (MCS), number of spatial streams (NSS), and bandwidth (BW) restriction used for forwarding the received communications data to the second wireless device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
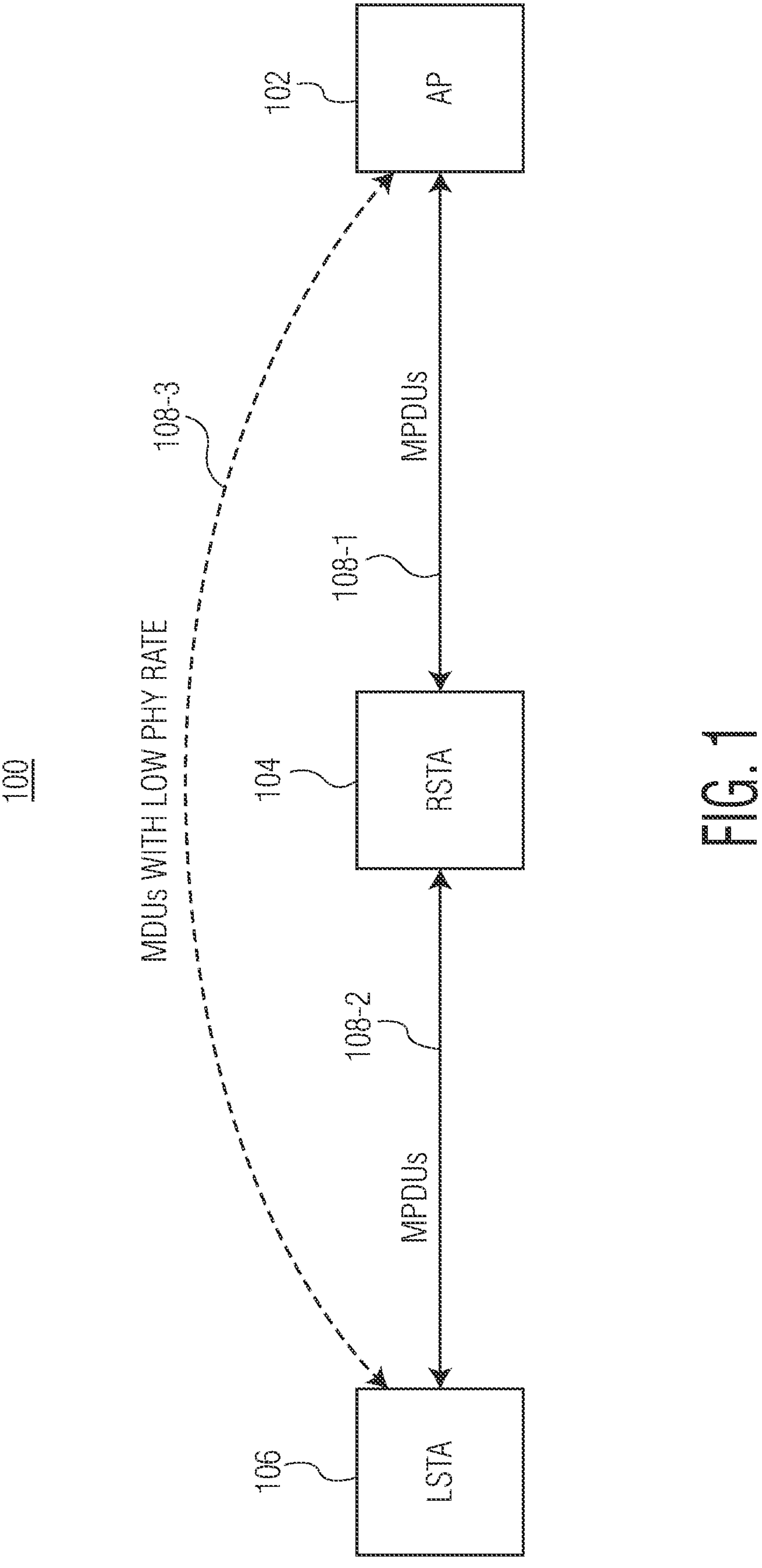
FIG. 1 depicts a wireless communications system with relay transmission capabilities in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Range extension (ER) PPDU formats are introduced from IEEE 802.11ax and carried over to IEEE 802.11be and beyond. Direct sequence spread spectrum (DSSS) is also defined in IEEE 802.11b in 2.4 GHz band with longer range. However, these ER physical layer (PHY) modes can extend the transmission range with limited 3 dB-6 dB, and the sustainable data rate is reduced to 1-3 mbps. Relay forwarding has been defined as independent transmission for each hop, which induced long latency and jitter. For example, typical WiFi extender/repeater/boosters have long end-to-end latency, high jitter, and low throughput. In a WiFi mesh router or EasyMesh program, each mesh router is interconnected with another mesh router through either wire or wireless. For wireless connection, every AP can relay the data from a master AP to its own stations (STAs). Each mesh node has a full function AP and at least one full function STA, thus is not cost effective. The AP relaying protocol is built on top of existing IEEE 802.11 Media Access Control (MAC)/PHY components, latency/jitter is also high compared to single-hop case. For IEEE 802.11 11ah/ad relaying mode, end to end latency and throughput may not be guaranteed with hop-by-hop block acknowledgement (BA)/acknowledgement (ACK) agreement and security protocol.

FIG. 1 depicts a wireless (e.g., WiFi) communications system 100 with relay transmission capabilities in accordance with an embodiment of the invention. In the embodiment depicted in FIG. 1, the wireless communications system 100 includes an AP 102, a relay station (STA) (RSTA) 104, and a leaf STA (LSTA) 106. The RSTA is located in the signal path between the AP and the LSTA and is configured to forward data between the AP and the LSTA. In some embodiments, the RSTA is configured to decode and forward data that is received from the AP to the LSTA and/or from the LSTA to the AP. The wireless communications system can be used in various applications, such as industrial applications, medical applications, computer applications, and/or consumer or enterprise applications. In some embodiments, the wireless communications system is compatible with an IEEE 802.11 protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes multiple APs with one RSTA and one LSTA, multiple APs with multiple RSTAs and one LSTA, multiple APs with one RSTA and multiple LSTAs, multiple APs with multiple RSTAs and multiple LSTAs, one AP with one RSTA and multiple LSTAs, or one AP with multiple RSTAs and multiple LSTAs. In another example, although the wireless communications system is shown in FIG. 1 as being connected in a certain topology, the network topology of the wireless communications system is not limited to the topology shown in FIG. 1. In some embodiments, the wireless communications system 100 described with reference to FIG. 1 involves single-link communications and the AP 102, the RSTA 104, and the LSTA 106 communicate through single communications links. In some embodiments, the wireless communications system 100 described with reference to FIG. 1 involves multi-link communications and the AP 102, the RSTA 104, and the LSTA 106 communicate through multiple communications links. Furthermore, the techniques described herein may also be applicable to each link of a multi-link communications system.

In the embodiment depicted in FIG. 1, the AP 102 may be implemented in hardware (e.g., circuits), software, firmware, or a combination thereof. The AP 102 may be fully or partially implemented as an integrated circuit (IC) device. In some embodiments, the AP 102 is a wireless AP compatible with at least one WLAN communications protocol (e.g., at least one IEEE 802.11 protocol). In some embodiments, the AP is a wireless AP that connects to a local area network (LAN) and/or to a backbone network (e.g., the Internet) through a wired connection and that wirelessly connects to one or more wireless stations (STAs), for example, through one or more WLAN communications protocols, such as an IEEE 802.11 protocol. In some embodiments, the AP includes at least one antenna, at least one transceiver operably connected to the at least one antenna, and at least one controller operably connected to the corresponding transceiver. In some embodiments, the transceiver includes a physical layer (PHY) device. The controller may be configured to control the transceiver to process received packets through the antenna. In some embodiments, the controller is implemented within a processor, such as a microcontroller, a host processor, a host, a digital signal processor (DSP), or a central processing unit (CPU), which can be integrated in a corresponding transceiver. In some embodiments, the AP 102 (e.g., a controller or a transceiver of the AP 102) implements upper layer Media Access Control (MAC) functionalities (e.g., beacon acknowledgement establishment, reordering of frames, etc.) and/or lower layer MAC functionalities (e.g., backoff, frame transmission, frame reception, etc.). Although the wireless communications system 100 is shown in FIG. 1 as including one AP, other embodiments of the wireless communications system 100 may include multiple APs. In these embodiments, each of the APs of the wireless communications system 100 may operate in a different frequency band. For example, one AP may operate in a 2.4 gigahertz (GHz) frequency band and another AP may operate in a 5 GHz frequency band.

In the embodiment depicted in FIG. 1, the RSTA 104 and the LSTA 106 may be implemented in hardware (e.g., circuits), software, firmware, or a combination thereof. The RSTA 104 and the LSTA 106 may be fully or partially implemented as IC devices. In some embodiments, at least one of the RSTA 104 and the LSTA 106 is a communications device compatible with at least one IEEE 802.11 protocol. In some embodiments, at least one of the RSTA 104 and the LSTA 106 is implemented in a laptop, a desktop personal computer (PC), a mobile phone, or other communications device that supports at least one WLAN communications protocol. In some embodiments, at least one of the RSTA 104 and the LSTA 106 implements a common MAC data service interface and a lower layer MAC data service interface. In some embodiments, each of the RSTA 104 and the LSTA 106 includes at least one antenna, at least one transceiver operably connected to the at least one antenna, and at least one controller connected to the corresponding transceiver. In some embodiments, the transceiver includes a PHY device. The controller may be configured to control the transceiver to process received packets through the antenna. In some embodiments, the controller is implemented within a processor, such as a microcontroller, a host processor, a host, a DSP, or a CPU, which can be integrated in a corresponding transceiver.

In the embodiment depicted in FIG. 1, the AP 102 communicates with the RSTA 104 via a communication link 108-1 (e.g., a wireless link), and the RSTA 104 communicates with the LSTA 106 via a communication link 108-2 (e.g., a wireless link). The RSTA is located between the AP and the LSTA to forward data to the LSTA (e.g., decode and forward data received from the AP to the LSTA) and/or to forward data to the AP (e.g., decode and forward data received from the LSTA to the AP). In some embodiments, data communicated between the AP, the RSTA, and the LSTA includes MAC protocol data units (MPDUs). An MPDU may include a frame header, a frame body, and a trailer with the MPDU payload encapsulated in the frame body. When data transfer is performed with two channel access, the system throughput of the wireless communications system 100 depicted in FIG. 1 may be halved linearly. The RSTA provides flexibility to achieve higher rate with shorter communications links 108-1, 108-2. In some embodiments, the AP 102 can directly communicate with the LSTA 106 via a communication link 108-3. Compared to the communications links 108-1, 108-2, the communication link 108-3 can have two times of distance, which corresponds to around 8 dB propagation loss (2.7 decaying exponent). To maintain the communication link 108-3, 8 dB better sensitivity and new PHY design is needed, the data rate is reduced to around ⅛ and physical layer protocol data unit (PPDU) airtime increases by 8 times. Although the AP 102, the RSTA 104, and the LSTA 106 are depicted in FIG. 1 as wirelessly communicating to each other via a corresponding communications link 108-1, 108-2, or 108-3, in other embodiments, the AP 102, the RSTA 104, and the LSTA 106 may wirelessly communicate to each other via multiple communication links.

In some embodiments, for point-to-point (P2P) communications, the AP 102 is replaced by another LSTA. In some embodiments, the RSTA 104 includes a relay STA that performs frame exchanges with the AP 102 and a relay AP that performs frame exchanges with the LSTA 106 and a relay functionality between the relay STA and the relay AP.

In some embodiments, the RSTA 104 is used when the associated AP 102 cannot reach a faraway LSTA (e.g., the LSTA 106) with high Modulation and Coding Scheme (MCS), number of spatial streams (NSS) or cannot reach a faraway STA (e.g., the LSTA 106) with the lowest MCS. The uplink (UL) frame transmission between the LSTA and the AP may be done by PPDUs transmitted from the LSTA to the RSTA 104 and PPDUs transmitted by the RSTA to the AP. The downlink (DL) frame transmission between the AP and LSTA may be done by PPDUs transmitted by the AP to the RSTA and PPDUs transmitted by the RSTA to the LSTA. The block acknowledgement (BA)/acknowledgement (ACK) can be end-to-end or hop-by-hop. With end-to-end BA, the DL BA transmitted by the AP may acknowledge the soliciting UL Aggregate MAC Protocol Data Unit (A-MPDU)/block acknowledgement request (BAR) from the LSTA that is forwarded by the RSTA, and the DL BA transmitted by the AP may acknowledge the soliciting A-MPDU/BAR from the LSTA that is forwarded by the RSTA. With hop-by-hop DL BA, the DL BA transmitted by the AP may acknowledge the soliciting UL A-MPDU/BAR from the RSTA, and the DL BA transmitted by the RSTA may acknowledge the soliciting UL A-MPDU/BAR from the LSTA. With hop-by-hop UL BA, the UL BA transmitted by the RSTA may acknowledge the soliciting DL A-MPDU/BAR from the AP, and the UL BA transmitted by the LSTA may acknowledge the soliciting DL A-MPDU/BAR from the RSTA.

Figure 2:
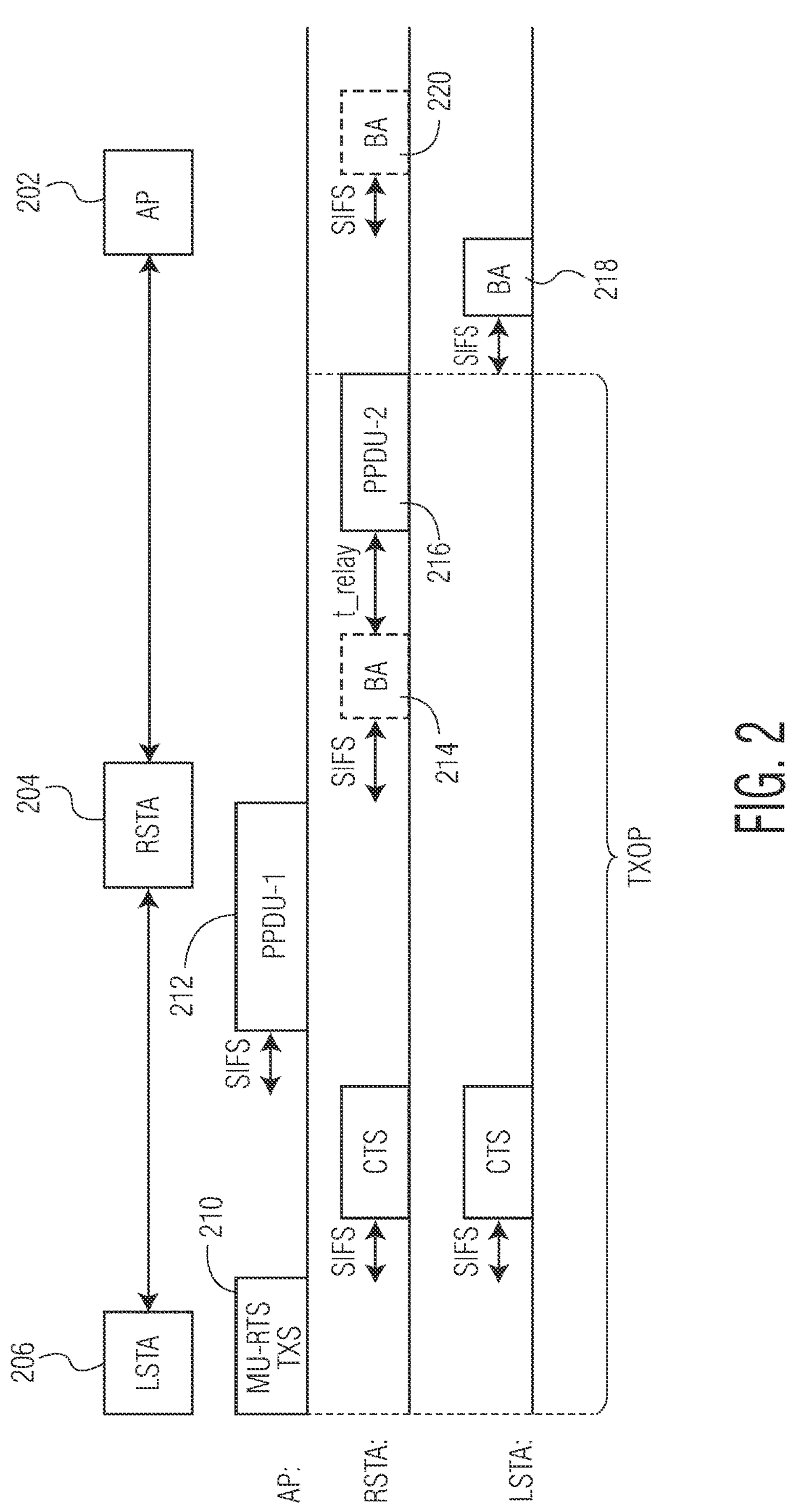
FIG. 2 depicts a frame exchange sequence diagram between an access point (AP), a relay station (RSTA), and a leaf station (LSTA).

FIG. 2 depicts a frame exchange sequence diagram between an AP 202, an RSTA 204, and an LSTA 206. In the frame exchange sequence diagram depicted in FIG. 2, the AP 202 may be implemented the same as or similar to the AP 102 depicted in FIG. 1, while the RSTA 204 and the LSTA 206 may be implemented the same as or similar to the RSTA 104 and the LSTA 106 depicted in FIG. 1, respectively. In the frame exchange sequence diagram depicted in FIG. 2, transmit opportunity (TXOP) sharing relay communications with one relay are implemented. A Multi User Request to Send (MU-RTS) triggered TXOP sharing (TXS) frame 210 may be sent by the AP 202 to reserve the TXOP for both hops (i.e., the AP 202 and the RSTA 204), and a portion of the TXOP is shared with the RSTA 204. The RSTA and/or the LSTA may transmit a Clear to Send (CTS) message or frame in response to the MU-RTS TXS frame. The AP transmits a Physical layer Protocol Data Unit (PPDU) PPDU-1 212 to the RSTA 204. For example, in the MU-RTS TXS frame, the AP reserves a 5 milliseconds (ms) TXOP, out of which 3 ms is allocated to the RSTA, and the AP uses 2 ms for PPDU-1 212 transmission. The RSTA 204 can perform data forwarding by decoding and forwarding. The transmission of BA 214 from the RSTA back to the AP may be either skipped or performed if an end-to-end BA agreement is set up. The relay processing delay (t relay) is either pre-defined for any relays (e.g., being equal to Short Interframe Spacing (SIFS)), or per-determined by the RSTA. The RSTA forwards or retransmits successfully received MPDUs carried in PPDU-1 in a Physical layer Protocol Data Unit (PPDU) PPDU-2 216 to the LSTA. The LSTA 206 sends a BA 218 back to the RSTA, which may send an optional BA 220 back to the AP 202. PPDU-2's Modulation and Coding Scheme (MCS)/number of spatial streams (NSS) may be informed to the RSTA with the information embedded in PPDU-1 or in a separate management frame. If the TXOP duration is not sufficient, the RSTA may choose to drop some MPDUs. In some embodiments, for point-to-point (P2P) communications, the AP 202 is replaced by another LSTA. In some embodiments, the RSTA 204 includes a relay STA that performs frame exchanges with the AP 202 and a relay AP that performs frame exchanges with the LSTA 206 and a relay functionality between the relay STA and the relay AP.

In some embodiments, in the PHY header of a frame (e.g., a PPDU), there is an indication about whether the frame is forwarded by an RSTA, and there is an indication about whether the end-to-end acknowledgement is applied to the frame. If a PPDU indicates that the carried frame(s) is not forwarded by an RSTA, the indication of end-to-end acknowledgement is reserved. In some embodiments, the indication is carried in a frame, e.g., in the MAC header.

In some embodiments, when a frame/A-MPDU that requires end-to-end acknowledgement is received by an LSTA/AP, the LSTA/AP can decide whether the acknowledgement is forwarded by a corresponding RSTA or not. The received frame/A-MPDU can be either forwarded by an RSTA or transmitted directly by the source device. When an LSTA/AP transmits a frame/A-MPDU that requires end-to-end acknowledgement, the LSTA/AP can select whether the frame/A-MPDU is forwarded by an RSTA or is sent direct to the AP/LSTA.

In some embodiments, blind forwarding is implemented by RSTAs. In an embodiment, if/when an LSTA or an AP transmits an Ultra High Reliability (UHR) PPDU that requires forwarding by the RSTAs, the PHY header of the UHR PPDU carries the BSS color of the AP, the AID of the destination device (AID of AP or LSTA). In some embodiments, SIFS after an RSTA receives a PPDU with forwarding requirement and associated AP's BSS Color in PHY header, it forwards the received PPDU without any change. For example, the transmitter (TX) bandwidth (BW) is same as the BW of the received PPDU; the MCS, NSS used for forwarding the received PPDU are same as the MCS, Nss of the received PPDU; the Service field and frame(s) in the PPDU forwarded by the RSTA are same as the Service field and frame(s) in the received PPDU; and/or the scrambler initialization value for forwarding the received frames is same as the scrambler initialization value of the received frames. In some embodiments, before the forwarding, the RSTA checks whether the medium is idle for such forwarding. The idle conclusion can be acquired if the network allocation vector (NAV) timer is 0 and the PHY Clear Channel Assessment (CCA) within SIFS between the received PPDU and the PPDU forwarding indicates medium idle. In another variant, the medium idle checking is not needed. In yet another variant, the received PPDU carries the indication about whether the medium idle checking is needed for the PPDU forwarding.

In some embodiments, in order to avoid the forwarded PPDU to be forwarded again, the PHY header indicates whether the PPDU is forwarded by RSTA or not. In an embodiment, if/when an RSTA receives a PPDU forwarded by another RSTA, the RSTA will not forward the received PPDU again. The forwarded PPDU indication can be done through a specific new field (forwarded indication) being equal to 1 in PHY header or setting the forwarding indication to 0.

In some embodiments, the transmission of BA/Ack when an LSTA or AP receives a PPDU with Data/Management/Control frame addressed to it (RA equal to its address) and the received PPDU indicates that it is forwarded by RSTA (forwarded indication in the PPDU is 1 or forwarding indication in the PPDU is 0). In another variant, the Ack/BA is carried in extended range (ER) Ultra High Reliability (UHR) PPDU where the forwarding is not needed. One restriction is that ER UHR PPDU is not used in the last responding PPDU to avoid EIFS recovery. The acknowledgement can also be applied to non-blind forwarding.

In some embodiments, when an RSTA forwards a received PPDU, the accuracy of SIFS between the start time of forwarding PPDU and the end time of the received PPDU is the same as the accuracy requirement of responding CTS solicited by MU-RTS.

In some embodiments, an end-to-end BA agreement is established between an LSTA and an AP directly or through an RSTA. In an embodiment, when the LSTA transmits a frame to its associated AP without RSTA's forwarding, the BA agreement negotiation can be done by exchanging Add Block Acknowledgment (ADDBA) Request/Response frames directly between the AP and the LSTA without forwarding them by the RSTA. In another embodiment, ADDBA Request/Response frames can be forwarded by an RSTA without the processing of the station management entity (SME) in the RSTA. In another embodiment, MPDU Start Spacing, the buffer size specified in ADDBA Request/Response frames should be no more than the RSTA's restriction if the forwarding of RSTA has the restriction of A-MPDU length. The RSTA's restriction, such as the restriction of A-MPDU length, MPDU Start Spacing can be announced as a part of the RSTA's capability. In an embodiment, the ADDBA Request/Response frames can be sent to the SME of the RSTA and the SME of the RSTA can update the buffer size (Buffer Size in Block Ack Parameter Set field, and Extended Buffer Size field in ADDBA Extension element if exists).

Figure 3:
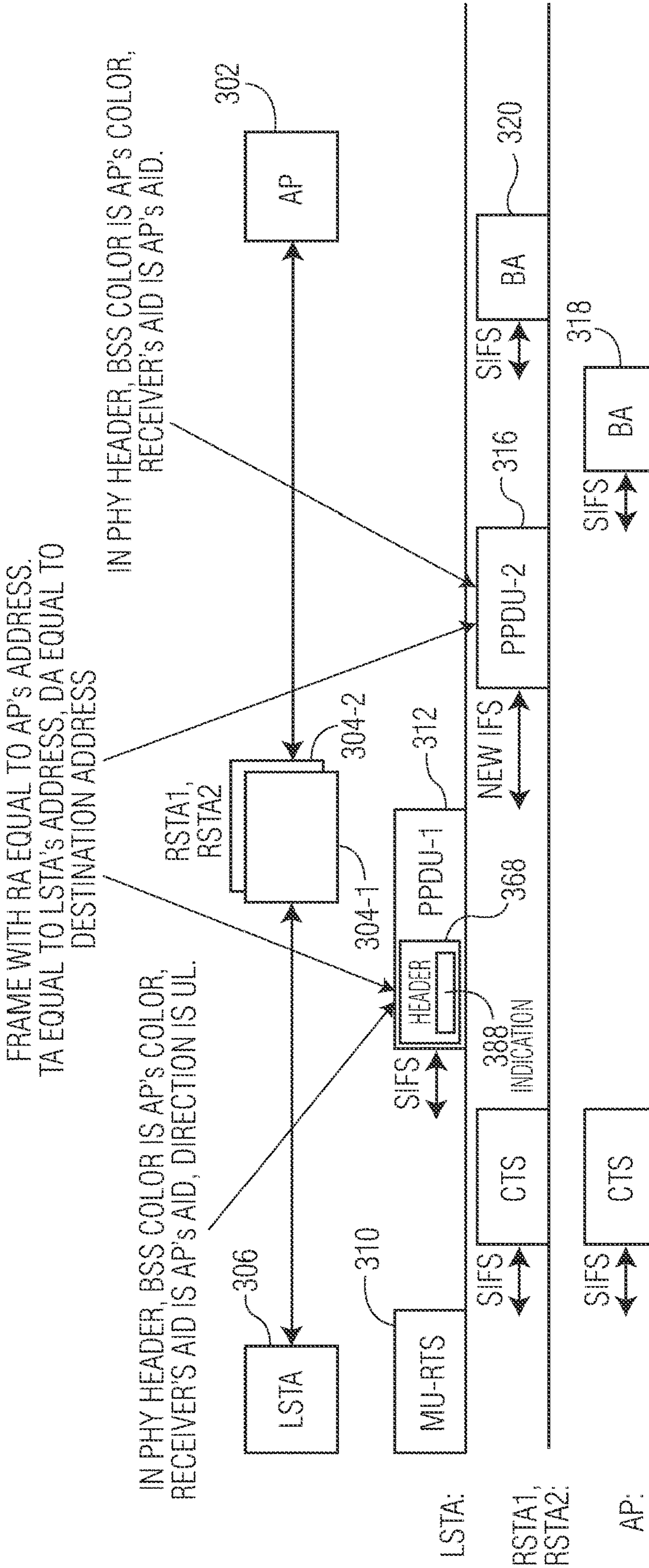
FIG. 3 depicts an uplink frame exchange sequence diagram between an LSTA, two RSTAs, and an AP.

FIG. 3 depicts an uplink frame exchange sequence diagram between an LSTA 306, two RSTAs 304-1, 304-2, and an AP 302. In the embodiment depicted in FIG. 3, the AP 302 may be implemented the same as or similar to the AP 102 depicted in FIG. 1, while the RSTAs 304-1, 304-2 and the LSTA 306 may be implemented the same as or similar to the RSTA 104 and the LSTA 106 depicted in FIG. 1, respectively. In some embodiments, for point-to-point (P2P) communications, the AP 302 is replaced by another LSTA. In the frame exchange sequence diagram depicted in FIG. 3, a MU-RTS frame 310 may be sent by the LSTA 306, for example, to reserve the TXOP for multiple hops (i.e., the LSTA 306 and the RSTAs 304-1, 304-2), and a portion of the TXOP is shared with the RSTAs 304-1, 304-2. The RSTAs and/or the AP may transmit a Clear to Send (CTS) message or frame in response to the MU-RTS frame. The LSTA 306 transmits a Physical layer Protocol Data Unit (PPDU) PPDU-1 312 to the RSTAs 304-1, 304-2. For example, in the MU-RTS frame, the LSTA reserves a 5 milliseconds (ms) TXOP, out of which 3 ms is allocated to the RSTAs 304-1, 304-2, and the LSTA uses 2 ms for PPDU-1 312 transmission. The PPDU-1 312 may be a frame with receiver address (RA) equal to the AP's address, transmitter address (TA) equal to the LSTA's address, destination address (DA) equal to the destination address. In the PHY header of the PPDU-1 312, the BSS color is AP's Color, the receiver's AID is AP's AID, and direction is uplink (UL). In some embodiments, a header 368 (e.g., the PHY header or the MAC header) of the PPDU-1 312 includes an indication 388 whether the PPDU-1 312 is to be forwarded by the RSTAs 304-1, 304-2. The RSTAs 304-1, 304-2 can perform data forwarding by decoding and forwarding. In some embodiments, the RSTAs 304-1, 304-2 are configured to determine to forward the PPDU-1 312 to the AP based on the indication 388 in the header 368. The relay processing delay (new Interframe Spacing (IFS)) is either pre-defined for any relays (e.g., being equal to SIFS), or per-determined by the RSTAs 304-1, 304-2. The RSTAs 304-1, 304-2 forward successfully received MPDUs carried in PPDU-1 in a Physical layer Protocol Data Unit (PPDU) PPDU-2 716 to the AP. Identical with the PPDU-1 312, the PPDU-2 316 may be a frame with receiver address (RA) equal to the AP's address, transmitter address (TA) equal to the LSTA's address, destination address (DA) equal to the destination address. In the PHY header of the PPDU-2 316, the BSS color is AP's Color, the receiver's AID is AP's AID. The AP 302 sends a BA 318 back to the RSTAs 304-1, 304-2, which may send an optional BA 320 back to the LSTA 306. When a BA frame is transmitted in a non-non-high throughput (HT) PPDU, the forwarding indication can be included in the MAC header of the BA frame. In the BA 318, the MAC header indicates the forwarding requirement. PPDU2's Modulation and MCS/NSS may be informed to the RSTAs with the information embedded in PPDU-1 or in a separate management frame. If the TXOP duration is not sufficient, the RSTAs may choose to drop some MPDUs.

Figure 4:
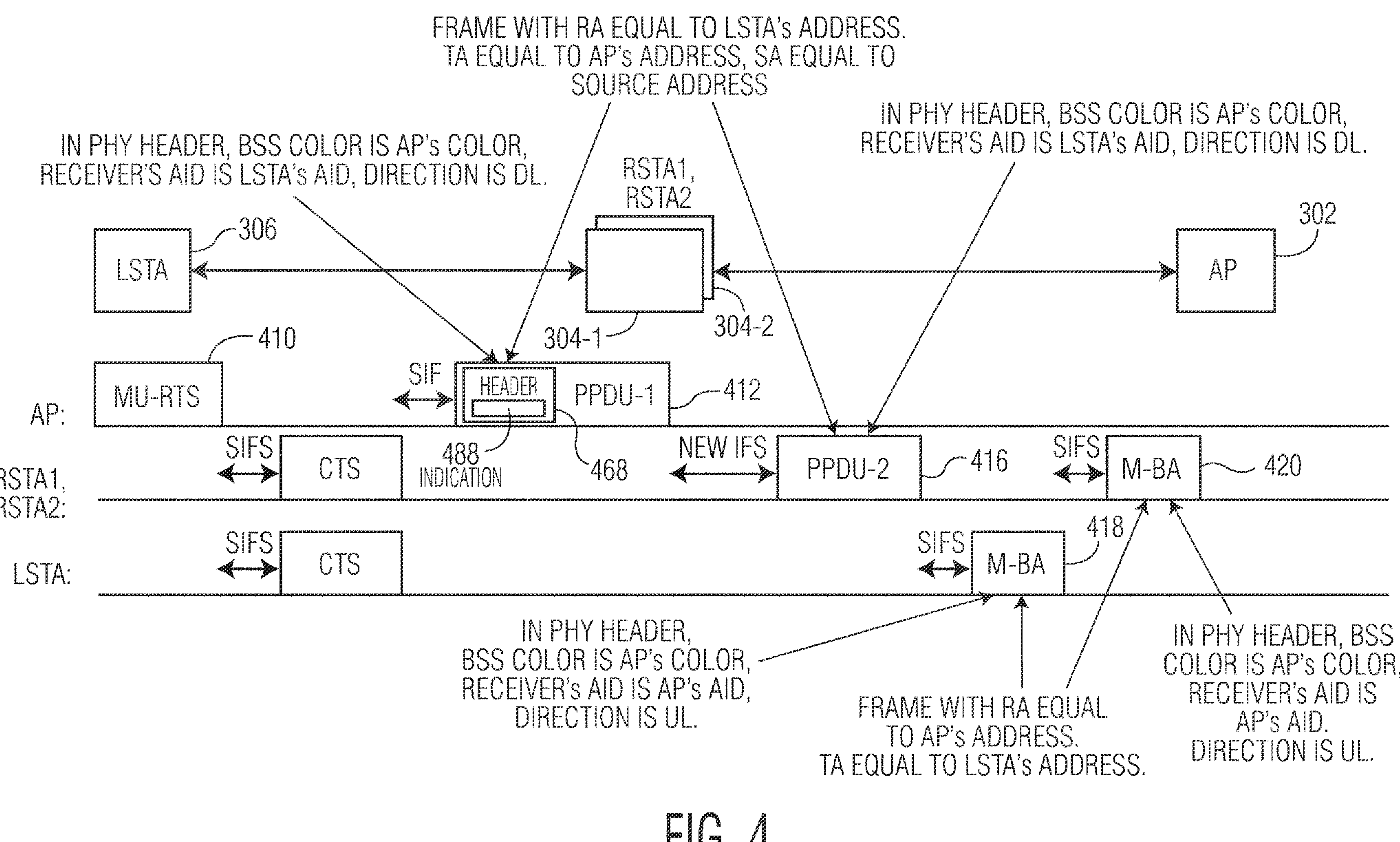
FIG. 4 depicts a downlink frame exchange sequence diagram between the AP, the RSTAs, and the LSTA depicted in FIG. 3.

FIG. 4 depicts a downlink frame exchange sequence diagram between the AP 302, the two RSTAs 304-1, 304-2, and the LSTA 306 depicted in FIG. 3. In the frame exchange sequence diagram depicted in FIG. 4, a MU-RTS frame 410 may be sent by the AP 302, for example, to reserve the TXOP for multiple hops (i.e., the AP 302 and the RSTAs 304-1, 304-2), and a portion of the TXOP is shared with the RSTAs 304-1, 304-2. The RSTAs and/or the AP may transmit a Clear to Send (CTS) message or frame in response to the MU-RTS frame. The AP transmits a Physical layer Protocol Data Unit (PPDU) PPDU-1 412 to the RSTAs 304-1, 304-2. For example, in the MU-RTS frame, the AP reserves a 5 milliseconds (ms) TXOP, out of which 3 ms is allocated to the RSTAs 304-1, 304-2, and the AP uses 2 ms for PPDU-1 412 transmission. The PPDU-1 412 may be a frame with receiver address (RA) equal to the LSTA's address, transmitter address (TA) equal to the AP's address, source address (SA) equal to source address. In the PHY header of the PPDU-1 412, the BSS color is AP's Color, the receiver's AID is LSTA's AID, and direction is DL. In some embodiments, a header 468 (e.g., the PHY header or the MAC header) of the PPDU-1 412 includes an indication 388 whether the PPDU-1 412 is to be forwarded by the RSTAs 304-1, 304-2. The RSTAs 304-1, 304-2 can perform data forwarding by decoding and forwarding. In some embodiments, the RSTAs 304-1, 304-2 are configured to determine to forward the PPDU-1 412 to the LSTA based on the indication 488 in the header 468. The relay processing delay (new Interframe Spacing (IFS)) is either pre-defined for any relays (e.g., being equal to SIFS), or per-determined by the RSTAs 304-1, 304-2. The RSTAs 304-1, 304-2 forward successfully received MPDUs carried in PPDU-1 in a Physical layer Protocol Data Unit (PPDU) PPDU-2 416 to the LSTA. Identical with the PPDU-1 412, the PPDU-2 416 may be a frame with receiver address (RA) equal to the LSTA's address, transmitter address (TA) equal to the AP's address, source address (SA) equal to source address. In the PHY header of the PPDU-2 416, the BSS color is AP's Color, the receiver's AID is LSTA's AID, and direction is DL. The LSTA sends a BA 418 back to the RSTAs, which may send an optional BA 420 back to the AP. Each of the BA 418 and the BA 420 may be a frame with receiver address (RA) equal to the AP's address, transmitter address (TA) equal to the LSTA's address. In the PHY header of the BA 418, the BSS color is AP's Color, the receiver's AID is AP's AID, direction is UL, and the indication of that the BA frame is to be forwarded by the RSTAs 304-1, 304-2. In the PHY header of the BA 420, the BSS color is AP's Color, the receiver's AID is AP's AID, and direction is UL. PPDU2's Modulation and MCS/NSS may be informed to the RSTAs with the information embedded in PPDU-1 or in a separate management frame. If the TXOP duration is not sufficient, the RSTAs may choose to drop some MPDUs.

Figure 5:
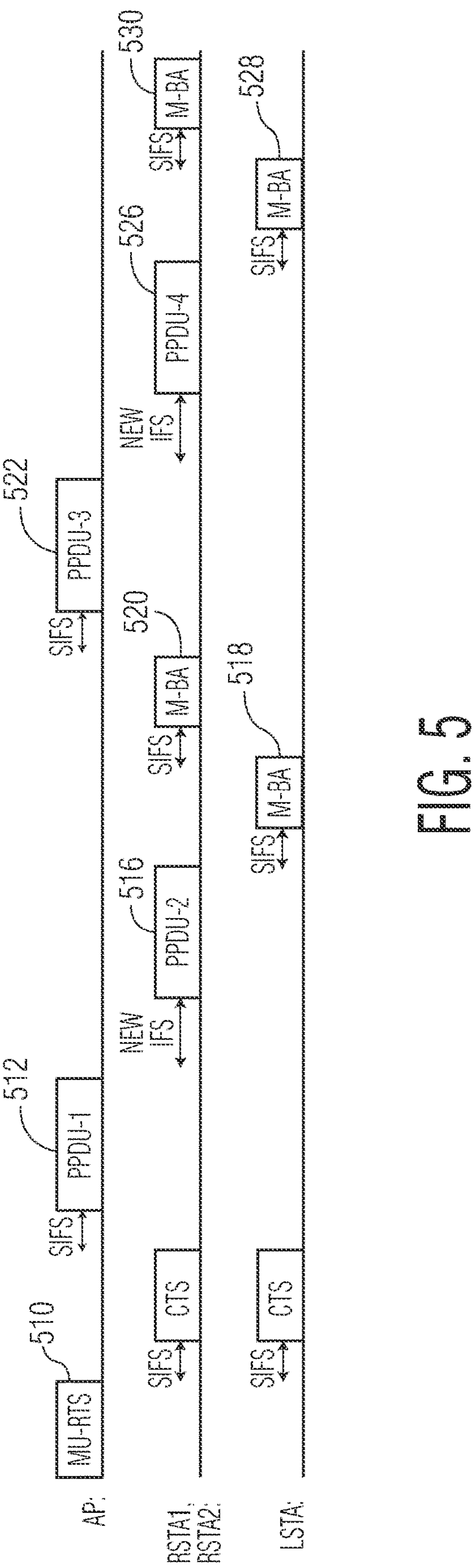
FIG. 5 depicts a downlink frame exchange sequence diagram between the AP, the two RSTAs, and the LSTA depicted in FIG. 3 in which a physical layer protocol data unit (PPDU) solicits an acknowledgement frame.

FIG. 5 depicts a downlink frame exchange sequence diagram between the AP 302, the RSTAs 304-1, 304-2, and the LSTA 306 depiction FIG. 3 in which a PPDU solicits an acknowledgement frame (e.g., Ack, BlockAck, Multi-STA BlockAck, etc.). In the frame exchange sequence diagram depicted in FIG. 5, a MU-RTS frame 510 may be sent by the AP 302, for example, to reserve the TXOP for multiple hops (i.e., the AP 302 and the RSTAs 304-1, 304-2), and a portion of the TXOP is shared with the RSTAs 304-1, 304-2. The RSTAs and/or the LSTA may transmit a Clear to Send (CTS) frame in response to the MU-RTS frame. The AP transmits a Physical layer Protocol Data Unit (PPDU) PPDU-1 512 to the RSTAs 304-1, 304-2. For example, in the MU-RTS frame, the AP reserves a 5 milliseconds (ms) TXOP, out of which 3 ms is allocated to the RSTAs 304-1, 304-2, and the AP uses 2 ms for PPDU-1 912 transmission. The RSTAs 304-1, 304-2 can perform data forwarding by decoding and forwarding. The relay processing delay (new Interframe Spacing (IFS)) is either pre-defined for any relays (e.g., being equal to SIFS), or per-determined by the RSTAs 304-1, 304-2. The RSTAs 304-1, 304-2 forward successfully received MPDUs carried in PPDU-1 in a Physical layer Protocol Data Unit (PPDU) PPDU-2 516 to the LSTA. PPDU-2's MCS/NSS may be informed to the RSTAs with the information embedded in PPDU-1 or in a separate management frame. The LSTA sends a BA 518 back to the RSTAs, which may send an optional BA 520 back to the AP. Subsequently, the AP transmits a Physical layer Protocol Data Unit (PPDU) PPDU-3 522 to the RSTAs 304-1, 304-2. The RSTAs 304-1, 304-2 forward successfully received MPDUs carried in PPDU-3 in a Physical layer Protocol Data Unit (PPDU) PPDU-4 526 to the LSTA. PPDU-4's MCS/NSS may be informed to the RSTAs with the information embedded in PPDU-3 or in a separate management frame. The LSTA sends a BA 528 back to the RSTAs, which may send an optional BA 530 back to the AP. If the TXOP duration is not sufficient, the RSTAs may choose to drop some MPDUs.

Figure 6:
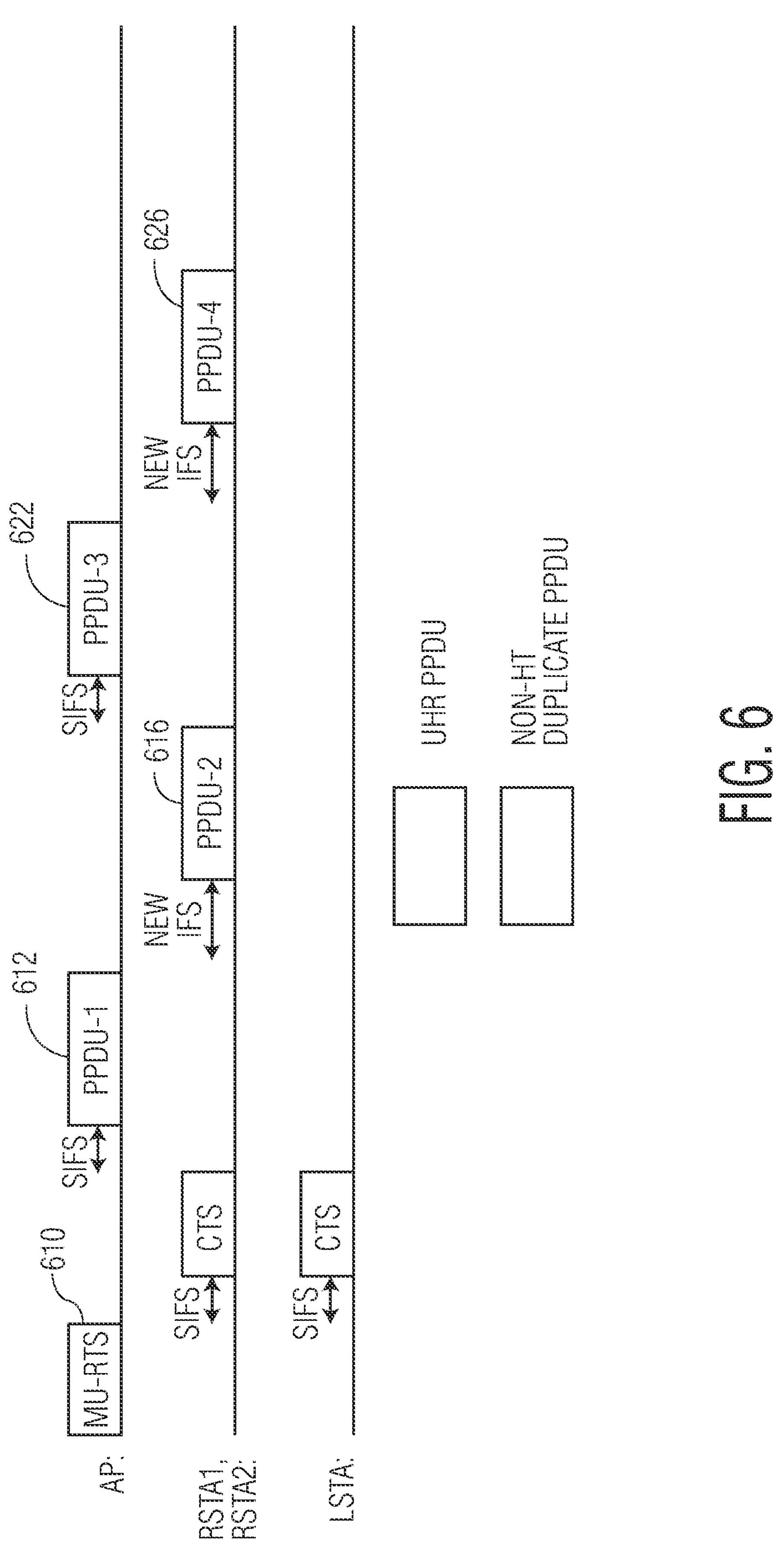
FIG. 6 depicts a downlink frame exchange sequence diagram between the AP, the two RSTAs, and the LSTA depicted in FIG. 3 in which a PPDU does not solicit an acknowledgement frame.

FIG. 6 depicts a downlink frame exchange sequence diagram between the AP 302, the two RSTAs 304-1, 304-2, and the LSTA 306 depicted in FIG. 3 in which a PPDU does not solicit an acknowledgement frame. In the frame exchange sequence diagram depicted in FIG. 6, a MU-RTS frame 610 may be sent by the AP 302, for example, to reserve the TXOP for multiple hops (i.e., the AP 302 and the RSTAs 304-1, 304-2), and a portion of the TXOP is shared with the RSTAs 304-1, 304-2. The RSTAs and/or the LSTA may transmit a Clear to Send (CTS) frame in response to the MU-RTS frame. The AP transmits a Physical layer Protocol Data Unit (PPDU) PPDU-1 612 to the RSTAs 304-1, 304-2. For example, in the MU-RTS frame, the AP reserves a 5 milliseconds (ms) TXOP, out of which 3 ms is allocated to the RSTAs 304-1, 304-2, and the AP uses 2 ms for PPDU-1 612 transmission. The RSTAs 304-1, 304-2 can perform data forwarding by decoding and forwarding. The relay processing delay (new Interframe Spacing (IFS)) is either pre-defined for any relays (e.g., being equal to SIFS), or per-determined by the RSTAs 304-1, 304-2. The RSTAs 304-1, 304-2 retransmit successfully received MPDUs carried in PPDU-1 in a Physical layer Protocol Data Unit (PPDU) PPDU-2 616 to the LSTA. PPDU-2's MCS/NSS may be informed to the RSTAs with the information embedded in PPDU-1 or in a separate management frame. Subsequently, the AP transmits a Physical layer Protocol Data Unit (PPDU) PPDU-3 622 to the RSTAs 304-1, 304-2. The RSTAs 304-1, 304-2 forward successfully received MPDUs carried in PPDU-3 in a Physical layer Protocol Data Unit (PPDU) PPDU-4 626 to the LSTA. PPDU-4's MCS/NSS may be informed to the RSTAs with the information embedded in PPDU-3 or in a separate management frame.

One or more examples of forwarding indication are described as follows. In a first approach, the UHR PHY header carries the BSS color, UL/DL indication and RSTA AID if blind forwarding is not used are also used for the forwarding operation. In a second approach, the frame in a non-High Throughput (HT) (duplicate) PPDU can indicate the forwarding requirement in MAC header, e.g., by using the reserved bits in Service field. HE Control field can be used to carry the RSTA AID for the forwarding if blind forwarding is not used. The Beacon frame and/or the control frames can use this approach. One variant is that the usage of non-HT PPDU is applied to RTS/CTS for TXOP protection, Ack/BA of the last frame of a TXOP to avoid EIFS recovery of non-UHR STAB. In a third approach, a specific UHR PPDU indicates the forwarding of the following frame in non-HT (duplicate) PPDU.

One or more examples of blind forwarding are described as follows. In a first option, Forwarding Indication includes Forwarding Required, Forwarding Done for blind forwarding. In a second option, Forwarding Indication includes Forwarding Required.

In some embodiments, single RSTA forwarding to/from a LSTA is performed. In a first option, Forwarding Indication includes Forwarding Required, RSTA AID to indicate the RSTA that forwards the frame.

One or more examples of blind forwarding or not are described as follows. In a first option, the blind forwarding and forwarding through dedicate RSTA can be mixed. In an embodiment, the TXOP protection RTS/CTS, MU-RTS/CTS use blind forwarding. In an embodiment, the last frame of the TXOP uses blind forwarding. Otherwise EIFS recovery will be used by non-UHR STAB. The other frames from/to a LSTA can be forwarded through the selected STA. In a second option, all the frames to/from each LSTA are forwarded through blind forwarding. In a third option, all the frames to/from a LSTA are forwarded through the selected STA.

One or more examples of forwarding indication in MAC header or not are described as follows. In a first option, Forwarding Indication is implemented in a MAC header or a PHY header. In some embodiments, the forwarding indication in MAC header can be used when the non-HT duplicate PPDU is used to carry the frame. In these embodiments, the additional restriction is that the indication in MAC header is used by a frame that doesn't require the immediate response, e.g., BA transmission. In some embodiments, the forwarding indication in PHY header can be used when the Ultra High Reliability (UHR) PPDU is used to carry the frame(s). In these embodiments, the additional restriction to such indication is that indication in PHY header is used by a frame that requires the immediate response, or is broadcast frame (Beacon frame is one broadcast frame). In an embodiment, a broadcast frame is transmitted through Legacy PPDU without forwarding indication or UHR PPDU with forwarding indication. For example, a non-UHR STA receives a broadcast frames in legacy PPDU. An UHR STA receives a broadcast frame in one of the legacy PPDU, UHR PPDU transmitted by AP, UHR PPDU transmitted by RSTA. When receiving Beacon in UHR PPDU transmitted by RSTA, the STA needs to adjust its timing synchronization function (TSF) time to SIFS+UHR PPDU time that carries the Beacon+The value in Timestamp field. In another option, Forwarding indication is implemented in PHY header or a separate specific UHR PPDU. The separate specific UHR PPDU can be used for the forwarding of the following non-HT duplicate PPDU.

In some embodiments, when an RSTA (e.g., the RSTA 104 depicted in FIG. 1) forwards a frame, the frame header of the frame is changed. In some embodiments, the receiver address (RA) and the transmitter address (TA) indicate the real transmitter and the recipient of a frame, respectively. When an RSTA forwards a frame, the RA and the TA can be updated. In some embodiments, additional addressing of a management frame is implemented.

Figure 7:
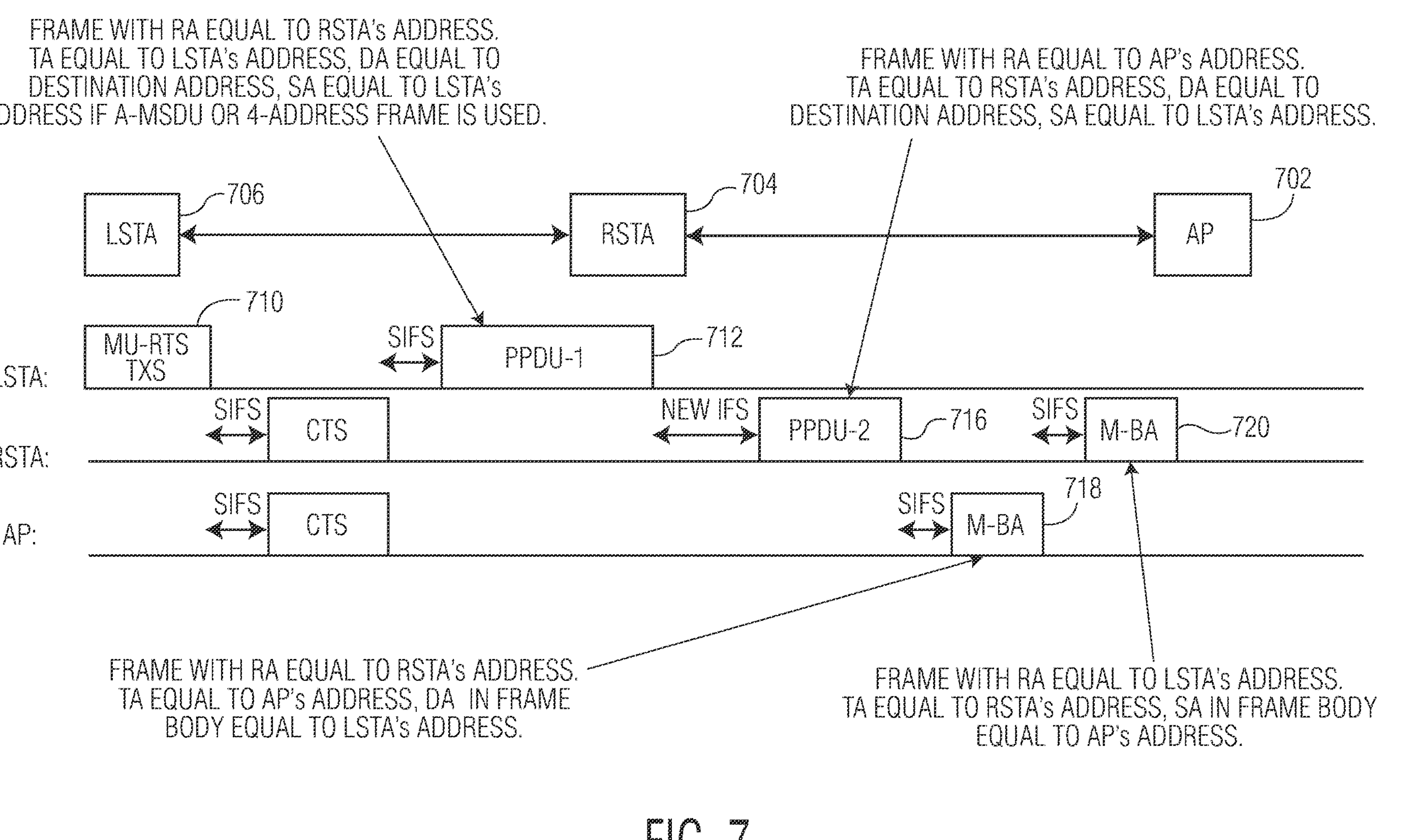
FIG. 7 depicts an uplink frame exchange sequence diagram between an LSTA, an RSTA, and an AP in which the receiver address (RA) and the transmitter address (TA) in the frame header of a frame forwarded by the RSTA are changed.

FIG. 7 depicts an uplink frame exchange sequence diagram between a LSTA 706, a RSTA 704, and an AP 702 in which the receiver address (RA) and the transmitter address (TA) in the frame header of a frame forwarded by the RSTA are changed. In the embodiment depicted in FIG. 7, the AP 702 may be implemented the same as or similar to the AP 102 depicted in FIG. 1, while the RSTA 704 and the LSTA 706 may be implemented the same as or similar to the RSTA 104 and the LSTA 106 depicted in FIG. 1, respectively. In some embodiments, for P2P communications, the AP 702 is replaced by another LSTA. In the frame exchange sequence diagram depicted in FIG. 7, TXOP sharing relay communications are implemented. A MU-RTS TXS frame 710 may be sent by the LSTA 706 to reserve the TXOP for both hops (i.e., the LSTA 706 and the RSTA 704), and a portion of the TXOP is shared with the RSTA 704. The RSTA and/or the AP may transmit a Clear to Send (CTS) frame in response to the MU-RTS TXS frame. The LSTA 706 transmits a Physical layer Protocol Data Unit (PPDU) PPDU-1 712 to the RSTA 704. For example, in the MU-RTS TXS frame, the LSTA reserves a 5 ms TXOP, out of which 3 ms is allocated to the RSTA, and the LSTA uses 2 ms for PPDU-1 712 transmission. The PPDU-1 712 may be a frame with the receiver address (RA) equal to the RSTA's address, the transmitter address (TA) equal to the LSTA's address, destination address (DA) equal to the destination address, source address (SA) equal to the LSTA's address if aggregate MAC Service Data Unit (A-MSDU) or a 4-address frame is used. The RSTA 704 can perform data forwarding by decoding and forwarding. The relay processing delay (new Interframe Spacing (IFS)) is either pre-defined for any relays (e.g., being equal to SIFS), or per-determined by the RSTA. The RSTA forwards successfully received MPDUs carried in PPDU-1 in a Physical layer Protocol Data Unit (PPDU) PPDU-2 716 to the AP. The PPDU-2 716 may be a frame with receiver address (RA) equal to the AP's address, transmitter address (TA) equal to the RSTA's address, destination address (DA) equal to the destination address, source address (SA) equal to the LSTA's address. The AP 702 sends a BA 718 back to the RSTA, which may send an optional BA 720 back to the LSTA 706. The BA 718 may be a frame with receiver address (RA) equal to the RSTA's address, transmitter address (TA) equal to the AP's address, destination address (DA) in frame body equal to the LSTA's address. The BA 720 may be a frame with receiver address (RA) equal to the LSTA's address, transmitter address (TA) equal to the RSTA's address, source address (SA) in frame body equal to the AP's address. PPDU-2's MCS/NSS may be informed to the RSTA with the information embedded in PPDU-1 or in a separate management frame. If the TXOP duration is not sufficient, the RSTA may choose to drop some MPDUs.

Figure 8:
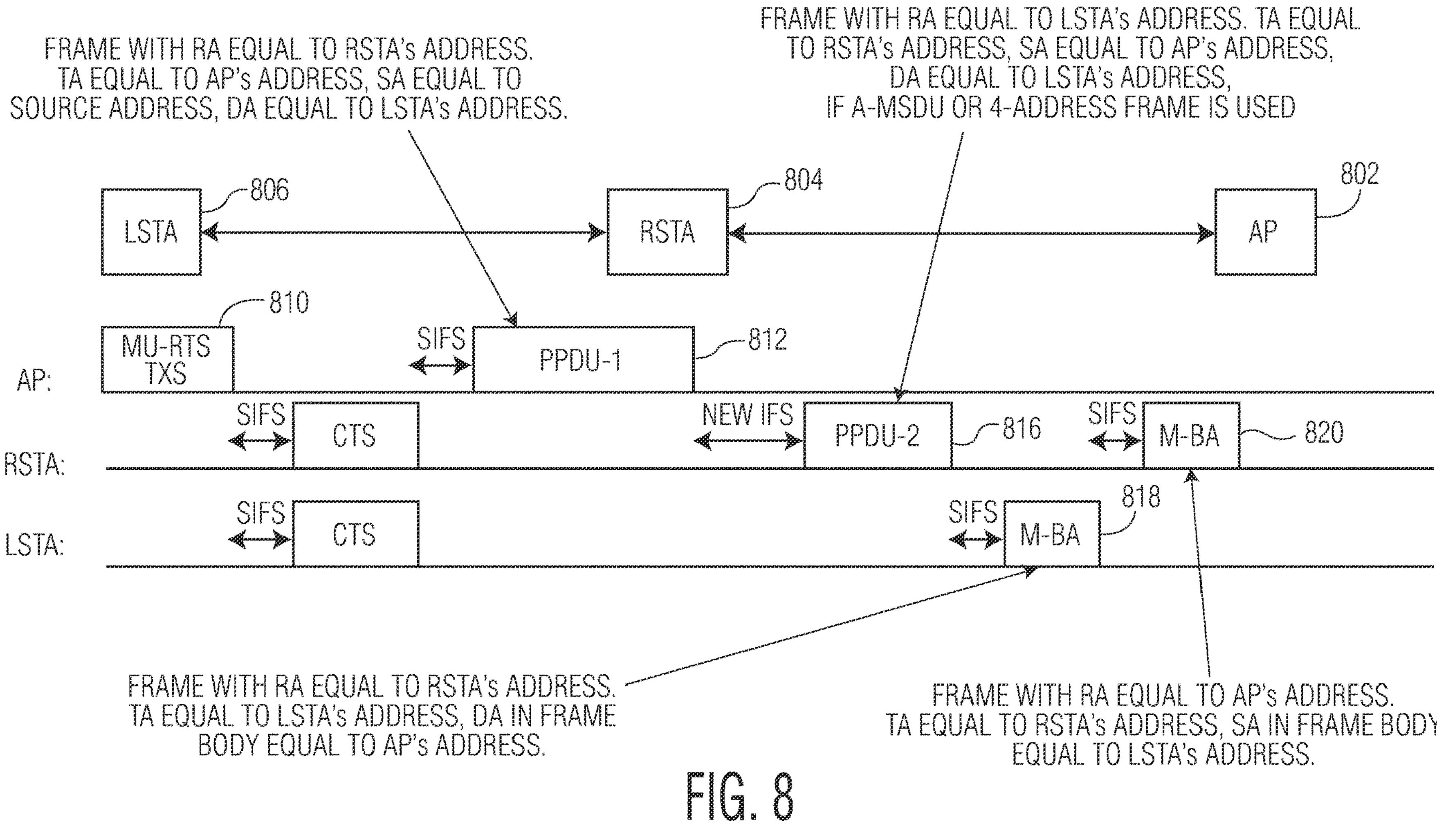
FIG. 8 depicts a downlink frame exchange sequence diagram between an AP, an RSTA, and an LSTA in which the receiver address (RA) and the transmitter address (TA) in the frame header of a frame forwarded by the RSTA are changed.

FIG. 8 depicts a downlink frame exchange sequence diagram between an AP 802, an RSTA 804, and an LSTA 806 which the receiver address (RA) and the transmitter address (TA) in the frame header of a frame forwarded by the RSTA are changed. In the embodiment depicted in FIG. 8, the AP 802 may be implemented the same as or similar to the AP 102 depicted in FIG. 1, while the RSTA 804 and the LSTA 806 may be implemented the same as or similar to the RSTA 104 and the LSTA 106 depicted in FIG. 1, respectively. In some embodiments, for P2P communications, the AP 802 is replaced by another LSTA. In the frame exchange sequence diagram depicted in FIG. 8, TXOP sharing relay communications are implemented. A MU-RTS TXS frame 810 may be sent by the AP 802 to reserve the TXOP for both hops (i.e., the AP 802 and the RSTA 804), and a portion of the TXOP is shared with the RSTA 804. The RSTA and/or the LSTA may transmit a Clear to Send (CTS) frame in response to the MU-RTS TXS frame. The AP transmits a Physical layer Protocol Data Unit (PPDU) PPDU-1 812 to the RSTA 804. For example, in the MU-RTS TXS frame, the AP reserves a 5 ms TXOP, out of which 3 ms is allocated to the RSTA, and the AP uses 2 ms for PPDU-1 812 transmission. The PPDU-1 812 may be a frame with receiver address (RA) equal to the RSTA's address, transmitter address (TA) equal to the AP's address, source address (SA) equal to source address, destination address (DA) equal to the LSTA's address. The RSTA 804 can perform data forwarding by decoding and forwarding. The relay processing delay (new Interframe Spacing (IFS)) is either pre-defined for any relays (e.g., being equal to SIFS), or per-determined by the RSTA. The RSTA forwards successfully received MPDUs carried in PPDU-1 in a Physical layer Protocol Data Unit (PPDU) PPDU-2 816 to the LSTA. The PPDU-2 816 may be a frame with receiver address (RA) equal to the LSTA's address, transmitter address (TA) equal to the RSTA's address, source address (SA) equal to the AP's address, destination address (DA) equal to LSTA's address if A-MSDU or a 4-address frame is used. The LSTA sends a BA 818 back to the RSTA, which may send an optional BA 820 back to the AP. The BA 818 may be a frame with receiver address (RA) equal to the RSTA's address, transmitter address (TA) equal to the LSTA's address, destination address (DA) in frame body equal to the AP's address. The BA 820 may be a frame with receiver address (RA) equal to the AP's address, transmitter address (TA) equal to the RSTA's address, source address (SA) in frame body equal to the LSTA's address. PPDU-2's MCS/NSS may be informed to the RSTA with the information embedded in PPDU-1 or in a separate management frame. If the TXOP duration is not sufficient, the RSTA may choose to drop some MPDUs.

When a management frame is forwarded by an RSTA, the management frame needs to carry the source of the management frame. When a management frame that requires the forwarding by an RSTA is addressed to the RSTA, the management frame needs to carry the destination of the management frame. To carry an additional address of a management frame, three options are described as follows. In a first option, a new element is defined to carry the additional address. In a second option, the MAC header carries the Association Identifier (AID) of the additional address. In a third option, the Address 3 is redefined for carrying the additional address.

In some embodiments, when an RSTA forwards a frame, the frame header of the frame is not changed. In some embodiments, the receiver address (RA) and the transmitter address (TA) indicate a corresponding LSTA and a corresponding AP. With this method, 4-address frame, A-MSDU, and adding additional address in control frame are not needed. In some embodiments, when an RSTA forwards a frame, the RA and TA are not updated. In an embodiment, the information in PHY header is used for the PPDU reception and forwarding. In PHY header of uplink (UL) PPDU, the BSS Color, Direction, End-to-end PPDU Indication, AID may be used. In an embodiment, BSS Color is related to the receiving AP. In an embodiment, direction indicates UL transmission. In an embodiment, End-to-end PPDU Indication indicates the frames in the PPDU are end-to-end acknowledged. In an embodiment, the AID identifies the RSTA or AP. In some embodiments, in PHY header of DL PPDU, the BSS Color, Direction indication, end-to-end PPDU indication, Rx AID and Destination AID are used. In an embodiment, BSS Color is related to the transmitting AP. In an embodiment, Direction indicates DL transmission. In an embodiment, End-to-end PPDU Indication indicates the frames in the PPDU are end-to-end acknowledged. In an embodiment, Rx AID identifies the RSTA or LSTA. In an embodiment, Destination AID is used by the RSTA to fill the PHY head of a PPDU forwarded to the next hop, e.g., the AID of the LSTA if the next hop is the LSTA, the AID of another RSTA if the carried frame required another RSTA's relay. In an embodiment, Destination AID is not needed if the DA of the MAC header is checked by the RSTA. In an embodiment, the destination AID is not needed if the receiver's LSTA.

Figure 9:
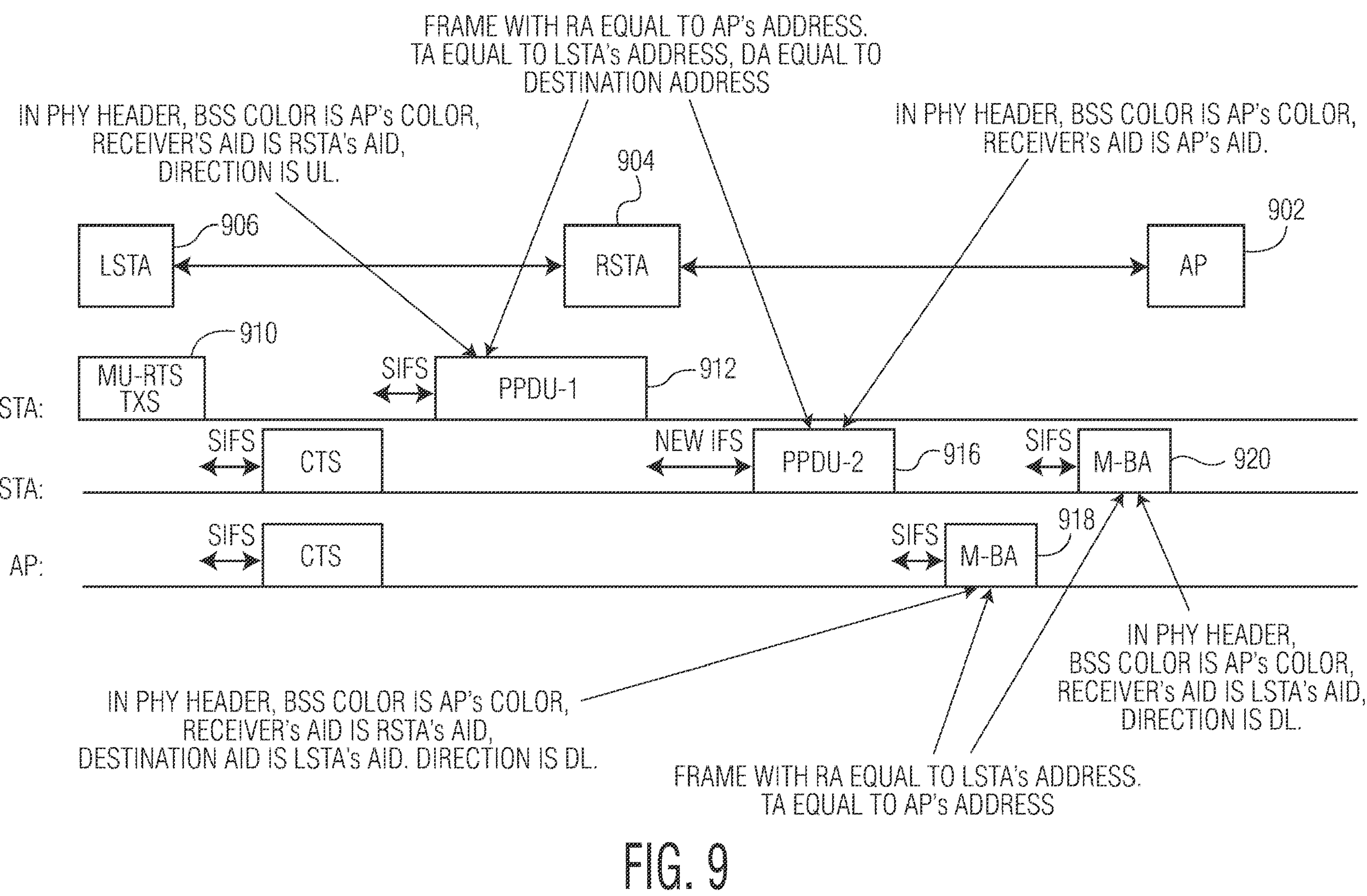
FIG. 9 depicts an uplink frame exchange sequence diagram between an LSTA, an RSTA, and an AP in which the receiver address (RA) and the transmitter address (TA) in the frame header of a frame forwarded by the RSTA are not changed.

FIG. 9 depicts an uplink frame exchange sequence diagram between an LSTA 906, an RSTA 904, and an AP 902 in which the receiver address (RA) and the transmitter address (TA) in the frame header of a frame forwarded by the RSTA are not changed. In the embodiment depicted in FIG. 9, the AP 902 may be implemented the same as or similar to the AP 102 depicted in FIG. 1, while the RSTA 904 and the LSTA 906 may be implemented the same as or similar to the RSTA 104 and the LSTA 106 depicted in FIG. 1, respectively. In some embodiments, for P2P communications, the AP 902 is replaced by another LSTA. In the frame exchange sequence diagram depicted in FIG. 9, TXOP sharing relay communications are implemented. A MU-RTS TXS frame 910 may be sent by the LSTA 906 to reserve the TXOP for both hops (i.e., the LSTA 906 and the RSTA 904), and a portion of the TXOP is shared with the RSTA 904. The RSTA and/or the AP may transmit a Clear to Send (CTS) frame in response to the MU-RTS TXS frame. The LSTA 906 transmits a Physical layer Protocol Data Unit (PPDU) PPDU-1 912 to the RSTA 904. For example, in the MU-RTS TXS frame, the LSTA reserves a 5 ms TXOP, out of which 3 ms is allocated to the RSTA, and the LSTA uses 2 ms for PPDU-1 912 transmission. The PPDU-1 912 may be a frame with receiver address (RA) equal to the AP's address, transmitter address (TA) equal to the LSTA's address, destination address (DA) equal to the destination address. In the PHY header of the PPDU-1 912, the BSS color is AP's Color, the receiver's AID is RSTA's AID, and direction is UL. The RSTA 904 can perform data forwarding by decoding and forwarding. The relay processing delay (new Interframe Spacing (IFS)) is either pre-defined for any relays (e.g., being equal to SIFS), or per-determined by the RSTA. The RSTA forwards successfully received MPDUs carried in PPDU-1 in a Physical layer Protocol Data Unit (PPDU) PPDU-2 916 to the AP. Identical with the PPDU-1 912, the PPDU-2 916 may be a frame with receiver address (RA) equal to the AP's address, transmitter address (TA) equal to the LSTA's address, destination address (DA) equal to the destination address. In the PHY header of the PPDU-2 916, the BSS color is AP's Color, the receiver's AID is AP's AID. The AP 902 sends a BA 918 back to the RSTA, which may send an optional BA 920 back to the LSTA 906. Each of the BA 918 and the BA 920 may be a frame with receiver address (RA) equal to the LSTA's address, transmitter address (TA) equal to the AP's address. In the PHY header of the BA 918, the BSS color is AP's Color, the receiver's AID is RSTA's AID, the destination's AID is LSTA's AID, and direction is DL. In the PHY header of the BA 920, the BSS color is AP's Color, the receiver's AID is LSTA's AID, and direction is DL. PPDU-2's MCS/NSS may be informed to the RSTA with the information embedded in PPDU-1 or in a separate management frame. If the TXOP duration is not sufficient, the RSTA may choose to drop some MPDUs.

Figure 10:
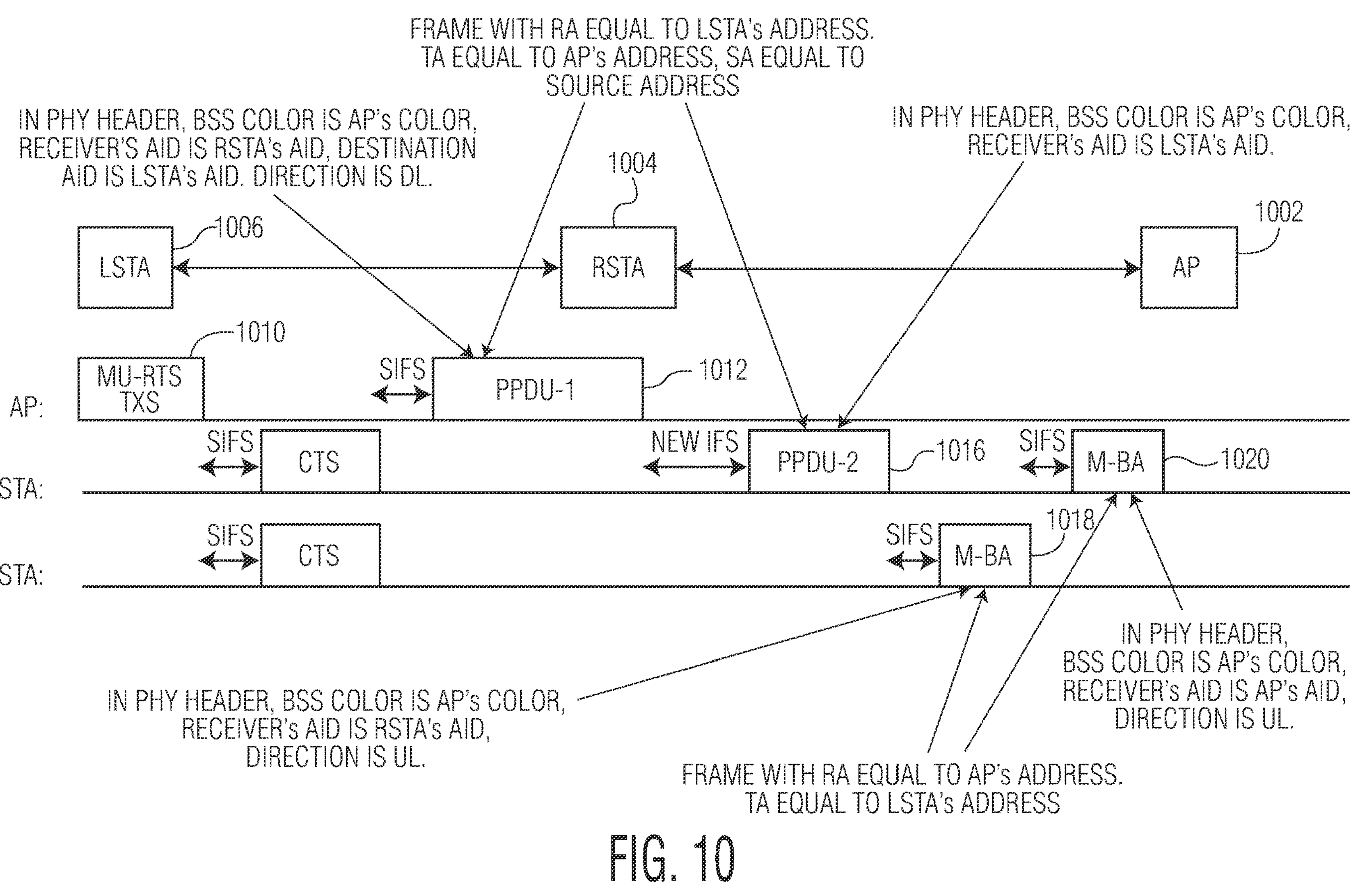
FIG. 10 depicts a downlink frame exchange sequence diagram between an AP, an RSTA, and an LSTA in which the receiver address (RA) and the transmitter address (TA) in the frame header of a frame forwarded by the RSTA are not changed.

FIG. 10 depicts a downlink frame exchange sequence diagram between an AP 1002, an RSTA 1004, and an LSTA 1006 in which the receiver address (RA) and the transmitter address (TA) in the frame header of a frame forwarded by the RSTA are not changed. In the embodiment depicted in FIG. 10, the AP 1002 may be implemented the same as or similar to the AP 102 depicted in FIG. 1, while the RSTA 1004 and the LSTA 1006 may be implemented the same as or similar to the RSTA 104 and the LSTA 106 depicted in FIG. 1, respectively. In some embodiments, for point-to-point (P2P) communications, the AP 1002 is replaced by another LSTA. In the frame exchange sequence diagram depicted in FIG. 10, transmit opportunity (TXOP) sharing relay communications are implemented. A MU-RTS TXS frame 1010 may be sent by the AP 1002 to reserve the TXOP for both hops (i.e., the AP 1002 and the RSTA 1004), and a portion of the TXOP is shared with the RSTA 1004. The RSTA and/or the LSTA may transmit a Clear to Send (CTS) frame in response to the MU-RTS TXS frame. The AP transmits a Physical layer Protocol Data Unit (PPDU) PPDU-1 1012 to the RSTA 1004. For example, in the MU-RTS TXS frame, the AP reserves a 5 milliseconds (ms) TXOP, out of which 3 ms is allocated to the RSTA, and the AP uses 2 ms for PPDU-1 1012 transmission. The PPDU-1 1012 may be a frame with receiver address (RA) equal to the LSTA's address, transmitter address (TA) equal to the AP's address, source address (SA) equal to source address. In the PHY header of the PPDU-1 1012, the BSS color is AP's Color, the receiver's AID is RSTA's AID, the destination's AID is LSTA's AID, and direction is DL. The RSTA 1004 can perform data forwarding by decoding and forwarding. The relay processing delay (new Interframe Spacing (IFS)) is either pre-defined for any relays (e.g., being equal to SIFS), or per-determined by the RSTA. The RSTA forwards successfully received MPDUs carried in PPDU-1 in a Physical layer Protocol Data Unit (PPDU) PPDU-2 1016 to the LSTA. Identical with the PPDU-1 1012, the PPDU-2 1016 may be a frame with receiver address (RA) equal to the LSTA's address, transmitter address (TA) equal to the AP's address, source address (SA) equal to source address. In the PHY header of the PPDU-2 1016, the BSS color is AP's Color, the receiver's AID is LSTA's AID. The LSTA sends a BA 1018 back to the RSTA, which may send an optional BA 1020 back to the AP. Each of the BA 1018 and the BA 1020 may be a frame with receiver address (RA) equal to the AP's address, transmitter address (TA) equal to the LSTA's address. In the PHY header of the BA 1018, the BSS color is AP's Color, the receiver's AID is RSTA's AID, the destination's AID is AP's AID, and direction is UL. In the PHY header of the BA 1020, the BSS color is AP's Color, the receiver's AID is AP's AID, and direction is UL.

PPDU-2's MCS/NSS may be informed to the RSTA with the information embedded in PPDU-1 or in a separate management frame. If the TXOP duration is not sufficient, the RSTA may choose to drop some MPDUs.

Figure 11:
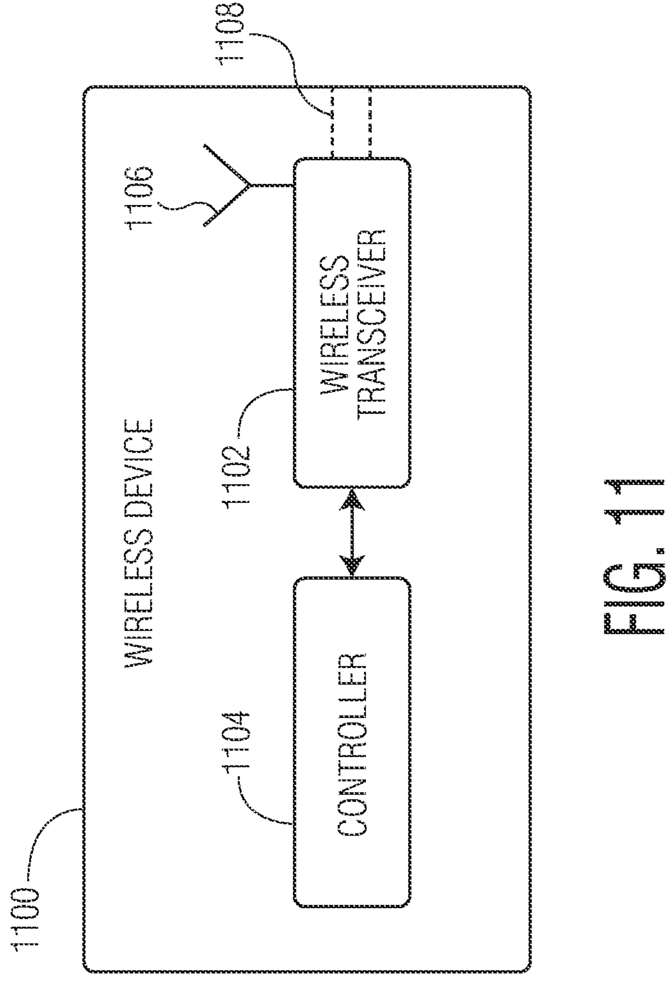
FIG. 11 depicts a wireless device in accordance with an embodiment of the invention.

FIG. 11 depicts a wireless device 1100 in accordance with an embodiment of the invention. The wireless device 1100 can be used in the wireless communications system 100 depicted in FIG. 1. For example, the wireless device 1100 may be an embodiment of the AP 102, the RSTA 104, and/or the LSTA 106 depicted in FIG. 1, the AP 202, the RSTA 204, and/or the LSTA 206 depicted in FIG. 2, the AP 302, the RSTAs 304-1, 304-2, and/or the LSTA 706 depicted in FIGS. 3 and 4, the AP 702, the RSTA 704, and/or the LSTA 706 depicted in FIG. 7, the AP 802, the RSTA 804, and/or the LSTA 806 depicted in FIG. 8, the AP 902, the RSTA 904, and/or the LSTA 906 depicted in FIG. 9, and/or the AP 1002, the RSTA 1004, and/or the LSTA 1006 depicted in FIG. 10. However, the AP 102, the RSTA 104, and/or the LSTA 106 depicted in FIG. 1, the AP 202, the RSTA 204, and/or the LSTA 206 depicted in FIG. 2, the AP 302, the RSTAs 304-1, 304-2, and/or the LSTA 706 depicted in FIGS. 3 and 4, the AP 702, the RSTA 704, and/or the LSTA 706 depicted in FIG. 7, the AP 802, the RSTA 804, and/or the LSTA 806 depicted in FIG. 8, the AP 902, the RSTA 904, and/or the LSTA 906 depicted in FIG. 9, and/or the AP 1002, the RSTA 1004, and/or the LSTA 1006 depicted in FIG. 10 are not limited to the embodiment depicted in FIG. 11.

In the embodiment depicted in FIG. 11, the wireless device 1100 includes a wireless transceiver 1102, a controller 1104 operably connected to the wireless transceiver, and at least one antenna 1106 operably connected to the wireless transceiver. In some embodiments, the wireless device 1100 may include at least one optional network port 1108 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 1100 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. In some embodiments, the wireless device is compatible with an Institute of Electrical and Electronics Engineers (IEEE) 802.11 protocol. In some embodiments, the wireless device is compatible with an Institute of Electrical and Electronics Engineers (IEEE) 802.11be protocol. In some embodiments, the wireless device is a component of a multi-link device (MLD).

The wireless device 1100 may be a wireless relay device. In some embodiments, the wireless device 1100 is a dedicated relay device. In some embodiments, the wireless device 1100 is a non-AP wireless station with a relaying function enabled. In some embodiments, the wireless device 1100 is an AP with a relaying function enabled. For example, the wireless device 1100 may be an embodiment of the RSTA 104 depicted in FIG. 1, the RSTA 204 depicted in FIG. 2, the RSTAs 304-1, 304-2 depicted in FIGS. 3 and 4, the RSTA 704 depicted in FIG. 7, the RSTA 804 depicted in FIG. 8, the RSTA 904 depicted in FIG. 9, and/or the RSTA 1004 depicted in FIG. 10. However, the RSTA 104 depicted in FIG. 1, the RSTA 204 depicted in FIG. 2, the RSTAs 304-1, 304-2 depicted in FIGS. 3 and 4, the RSTA 704 depicted in FIG. 7, the RSTA 804 depicted in FIG. 8, the RSTA 904 depicted in FIG. 9, and/or the RSTA 1004 depicted in FIG. 10 are not limited to the embodiment depicted in FIG. 11. In accordance with an embodiment of the invention, the wireless transceiver 1102 is configured to receive, from a first wireless device, communications data and the controller 1104 is configured to determine whether to forward the received communications data to a second wireless device. The controller may be further configured to determine whether to forward the received communications data to the second wireless device based on a header of the communications data. In some embodiments, the header includes a physical layer (PHY) header of the communications data. In some embodiments, the header includes a Media Access Control (MAC) header of the communications data. In some embodiments, the controller is further configured to determine whether end-to-end acknowledgement is applied to the communications data. In some embodiments, the controller is further configured to update a receiver address (RA) and a transmitter address (TA) of a frame of the received communications data when forwarding the received communications data to the second wireless device. In some embodiments, the controller is further configured to keep an RA and a TA of a frame of the received communications data when forwarding the received communications data to the second wireless device. In some embodiments, the wireless relay device is compatible with an IEEE 802.11 protocol. In some embodiments, the wireless transceiver is further configured to share a transmit opportunity (TXOP) of the first wireless device. In some embodiments, the wireless transceiver is further configured to share the TXOP of the first wireless device in a multi-hop transmission, where the multi-hop transmission is conducted through an aggregated physical layer protocol data unit (PPDU). In some embodiments, the aggregated PPDU includes a first PPDU and a second PPDU that is a relayed version of the first PPDU.

One or more examples of estimation of transmission (Tx) time of an RSTA are described as follows. In some embodiments, an RSTA notifies one or more LSTAs its uplink MCS, Nss and/or the BW restriction for transmitting the frames to an AP. An RSTA may notify an AP its down link MCS, NSS and/or the BW restriction for transmitting the frames to each LSTA. In some embodiments, the BW restriction is the operating BW of the destination (e.g., an AP or an LSTA). The notification can be done through a management frame or a MAC header, e.g., the newly defined HE Control field, or a modified BA frame. The notification can be done each time the respective MCS, Nss, and/or the operating BW is changed. The AP or LSTA uses the received notification of MCS, Nss and/or the BW information to adjust the initial A-MPDU size and to decide the medium Tx time of the PPDU forwarded by the RSTA. When an RSTA forwards a PPDU and the remaining time of the TXOP is not enough for the forwarding of the whole PPDU, the RSTA may forward part of the received frames, or may not forward the received frame(s). This may happen, e.g., when the RSTA cannot use the recipient's operating BW. In some embodiments, an RSTA is not allowed to perform the fragmentation of the received frame for end-to-end acknowledgement.

In some embodiments, when an LSTA/AP transmits a frame/A-MPDU that requires end-to-end acknowledgement and is forwarded by an RSTA, the LSTA/AP selects the allowed maximal MPDU length per the minimal value of the RSTA's maximal MPDU length and the AP's maximal MPDU length.

Figure 12:
FIG. 12 is a process flow diagram of a method for wireless communications in accordance with an embodiment of the invention.

FIG. 12 is a process flow diagram of a method for wireless communications in accordance with an embodiment of the invention. At block 1202, communications data is received from a first wireless device. At block 1204, whether to forward the received communications data to a second wireless device is determined. In some embodiments, whether to forward the received communications data to the second wireless device is determined based on a physical layer (PHY) header or a Media Access Control (MAC) header of the communications data. In some embodiments, whether end-to-end acknowledgement is applied to the communications data is determined. In some embodiments, a receiver address (RA) and a transmitter address (TA) of a frame of the received communications data are updated when forwarding the received communications data to the second wireless device. In some embodiments, an RA and a TA of a frame of the received communications data are kept when forwarding the received communications data to the second wireless device. The first wireless device and/or the second wireless device may be the same as or similar to the AP 102 or the LSTA 106 depicted in FIG. 1, the AP 202 or the LSTA 206 depicted in FIG. 2, the AP 302 or the LSTA 306 depicted in FIGS. 3 and 4, the AP 702 or the LSTA 706 depicted in FIG. 7, the AP 802 or the LSTA 806 depicted in FIG. 8, the AP 902 or the LSTA 906 depicted in FIG. 9, the AP 1002 or the LSTA 1006 depicted in FIG. 10, and/or the wireless device 1100 depicted in FIG. 11.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless relay device comprising:

a wireless transceiver configured to receive, from a first wireless device, communications data; and a controller configured to determine to forward the received communications data to a second wireless device based on a basic service set (BSS) color of the first wireless device in the communication data, an association identifier (AID) of the second wireless device in the communication data, and a forwarding indication in the communication data, wherein the forwarding indication is a bit which has one of a first value and a second value, wherein the first value to indicate forwarding is required and the second value to indicate forwarding is not required.

2. The wireless relay device of claim 1, wherein the controller is further configured to determine whether to forward the received communications data to the second wireless device based on a header of the communications data, the header comprising the BSS color, the AID, and the forwarding indication.

3. The wireless relay device of claim 2, wherein the header comprises a physical layer (PHY) header of the communications data.

4. The wireless relay device of claim 2, wherein the header comprises a Media Access Control (MAC) header of the communications data.

5. The wireless relay device of claim 1, wherein the controller is further configured to determine whether end-to-end acknowledgement is applied to the communications data.

6. The wireless relay device of claim 1, wherein the controller is further configured to update a receiver address (RA) and a transmitter address (TA) of a frame of the received communications data when forwarding the received communications data to the second wireless device.

7. The wireless relay device of claim 1, wherein the controller is further configured to keep a receiver address (RA) and a transmitter address (TA) of a frame of the received communications data when forwarding the received communications data to the second wireless device.

8. The wireless relay device of claim 1, wherein the wireless relay device is compatible with an Institute of Electrical and Electronics Engineers (IEEE) 802.11 protocol.

9. The wireless relay device of claim 1, wherein the wireless transceiver is further configured to share a transmit opportunity (TXOP) of the first wireless device.

10. The wireless relay device of claim 9, wherein the wireless transceiver is further configured to share the TXOP of the first wireless device in a multi-hop transmission, wherein the multi-hop transmission is conducted through an aggregated physical layer protocol data unit (PPDU).

11. The wireless relay device of claim 10, wherein the aggregated PPDU comprises a first PPDU and a second PPDU that is a relayed version of the first PPDU.

12. The wireless relay device of claim 1, wherein the header of the communications data comprises the indication whether the communications data is to be forwarded by the wireless relay device, and wherein the header comprises a physical layer (PHY) header or a Media Access Control (MAC) header of the communications data.

13. The wireless relay device of claim 12, wherein the controller is further configured to determine whether to forward the received communications data to the second wireless device based on the indication in the header.

14. The wireless relay device of claim 1, wherein the wireless transceiver is further configured to forward the received communications data to the second wireless device after a pre-defined interframe spacing (IFS).

15. The wireless relay device of claim 1, wherein the wireless transceiver is further configured to transmit, to the first wireless device, a frame including information regarding modulation and coding scheme (MCS), number of spatial streams (NSS), and bandwidth (BW) restriction used for determining a transmit medium time for forwarding the received communications data to the second wireless device and a size of an aggregate MAC protocol data unit (A-MPDU) of the communication data.

16. A wireless relay device compatible with an Institute of Electrical and Electronics Engineers (IEEE) 802.11 protocol, wherein the wireless relay device comprises:

a wireless transceiver configured to receive, from a first wireless device, communications data; and a controller configured to forward the received communications data to a second wireless device based on a fields of a header of the communications data including a basic service set (BSS) color of the first wireless device in the communication data, an association identifier (AID) of the second wireless device in the communication data, and a forwarding indication in the communication data, wherein the forwarding indication is a bit which has one of a first value and a second value, wherein the first value to indicate forwarding is required and the second value to indicate forwarding is not required and to determine whether end-to-end acknowledgement is applied to the communications data.

17. The wireless relay device of claim 16, wherein the header comprises a physical layer (PHY) header of a physical layer protocol data unit (PPDU) of the communications data.

18. The wireless relay device of claim 16, wherein the header comprises a Media Access Control (MAC) header of a frame of the communications data.

19. The wireless relay device of claim 16, wherein the controller is further configured to update a receiver address (RA) and a transmitter address (TA) of a frame of the received communications data when forwarding the received communications data to the second wireless device.

20. The wireless relay device of claim 16, wherein the controller is further configured to keep a receiver address (RA) and a transmitter address (TA) of a frame of the received communications data when forwarding the received communications data to the second wireless device.

21. The wireless relay device of claim 16, wherein the wireless transceiver is further configured to share a transmit opportunity (TXOP) of the first wireless device.

22. The wireless relay device of claim 21, wherein the wireless transceiver is further configured to share the TXOP of the first wireless device in a multi-hop transmission, wherein the multi-hop transmission is conducted through an aggregated physical layer protocol data unit (PPDU).

23. The wireless relay device of claim 16, wherein the BSS color and the AID correspond to values defined by an Institute of Electrical and Electronics Engineers (IEEE) 802.11 protocol.

24. A method for wireless communications, the method comprising:

receiving, from a first wireless device, communications data; and determining to forward the received communications data to a second wireless device based on a basic service set (BSS) color of the first wireless device in the communication data, an association identifier (AID) of the second wireless device in the communication data, and a forwarding indication in the communication data, wherein the forwarding indication is a bit which has one of a first value and a second value, wherein the first value to indicate forwarding is required and the second value to indicate forwarding is not required.

25. The method of claim 24, further comprising:

transmitting, to the first wireless device, a frame including information regarding modulation and coding scheme (MCS), number of spatial streams (NSS), and bandwidth (BW) restriction which is used by the first wireless device for determining a transmit medium time for forwarding the received communications data to the second wireless device and a size of an aggregate MAC protocol data unit (A-MPDU) of the communication data.

* * * * *